(12) United States Patent
Krinke, II (10) Patent No.: US 8,244,998 B1
(45) Date of Patent: Aug. 14, 2012

(54) OPTIMIZED BACKUP FOR A CLUSTERED STORAGE SYSTEM

(75) Inventor: Thomas L. Krinke, II, Forest Lake, MN (US)

(73) Assignee: Symantec Corporation, Mountain View, CA (US)

( * ) Notice: Subject to any disclaimer, the term of this patent is extended or adjusted under 35 U.S.C. 154(b) by 423 days.

(21) Appl. No.: 12/332,522

(22) Filed: Dec. 11, 2008

(51) Int. Cl.
*G06F 12/00* (2006.01)
(52) U.S. Cl. .......................... 711/162; 711/161
(58) Field of Classification Search .............. 711/161, 711/162
See application file for complete search history.

(56) References Cited

U.S. PATENT DOCUMENTS

| | | | |
|---|---|---|---|
| 6,609,213 B1 * | 8/2003 | Nguyen et al. .............. | 714/4.12 |
| 7,386,757 B2 | 6/2008 | Lindenstruth | |
| 7,464,223 B2 | 12/2008 | Watanabe | |
| 7,584,339 B1 | 9/2009 | Bingham | |
| 7,613,947 B1 | 11/2009 | Coatney | |
| 7,657,586 B2 | 2/2010 | Rodriguez | |
| 7,694,166 B1 | 4/2010 | Suggs | |
| 2005/0022202 A1 * | 1/2005 | Sannapa Reddy et al. ... | 718/105 |
| 2007/0094316 A1 * | 4/2007 | Rodriguez et al. ........... | 707/205 |

OTHER PUBLICATIONS

"The Clustered Storage Revolution," Isilon Systems, Whitepages, Seattle, WA, Jan. 2008, http://www.isilon.com/pdfs/white_papers/Clustered_Storage_Revolution.pdf.
"Symantec Backup ExecTM 12 for Windows Servers—Administrator's Guide," Symantec Corp., 2007, ftp://exftpp.symantec.com/pub/support/products/Backup_Exec_for_WindowsNT/297830.pdf.

* cited by examiner

*Primary Examiner* — Jared Rutz
*Assistant Examiner* — Gurtej Bansal
(74) *Attorney, Agent, or Firm* — Meyertons, Hood, Kivlin, Kowert & Goetzel, P.C.

(57) ABSTRACT

A system and method for backing up data from a clustered storage system are described herein. The method may operate to automatically determine the configuration of the clustered storage system, e.g., by detecting each storage node in the clustered storage system, detecting the storage volumes hosted by each storage node, and detecting the backup storage devices to which each storage node is connected. The method may operate to backup the plurality of storage volumes by performing a plurality of backup tasks. Performing each respective backup task may comprises selecting a particular storage volume to backup from a particular storage node to a particular backup storage device depending upon the configuration information and information indicating currently active backup tasks in the clustered storage system.

20 Claims, 8 Drawing Sheets

$$\text{Target number of jobs for Node X} = \left[ \frac{\text{drive}_1}{\text{No. of nodes sharing drive}_1} + \frac{\text{drive}_2}{\text{No. of nodes sharing drive}_2} + \ldots + \frac{\text{drive}_n}{\text{No. of nodes sharing drive}_n} \right] * \frac{\text{remaining volumes on Node X}}{\text{Total remaining volumes to be backed up}} \longrightarrow \text{rounded up to whole number}$$

OPTIMIZED BACKUP FOR A CLUSTERED STORAGE SYSTEM

BACKGROUND OF THE INVENTION

1. Field of the Invention

This invention is related to clustered storage systems which include a plurality of storage nodes. More particularly, the invention relates to a system and method for optimizing backup tasks to efficiently backup data from the storage nodes to a plurality of backup storage devices coupled to the storage nodes.

2. Description of the Related Art

Clustered storage systems include a plurality of storage nodes (e.g., specialized computers designed to provide file storage services) that work together as one storage system. A clustered storage system may provide more space for files than individual file servers, and may implement a distributed file system with a single name space. This may allow a storage volume to be striped across multiple storage nodes and may make management easier because only one file system is being managed, not a separate file system for each storage node. Clustered storage systems may also increase robustness by providing failover services. For example, if one storage node in the cluster fails then the storage volumes hosted by that node may be automatically failed over to other storage nodes in the cluster.

It is important to backup the data of a clustered storage system to protect against hardware failure, accidental deletion, or data corruption. The clustered storage system may include one or more separate backup storage devices onto which the data from the storage nodes can be backed up. In order to backup the clustered storage system, it is necessary to know various aspects of the cluster's configuration, such as the cluster topology (e.g., which storage nodes and backup storage devices are present in the cluster, and how they are interconnected), as well as other information, such as which storage volumes are implemented in the cluster and which storage node hosts each volume. In addition, the backup software must select which backup storage device each storage volume should be backed up to, determine the order in which to backup the storage volumes, determine the number of backup tasks to be executed simultaneously, etc. These decisions can affect the efficiency of the backup operations and the performance of the clustered storage system.

SUMMARY

Various embodiments of a system and method for backing up data from a clustered storage system are described herein. The clustered storage system may include a plurality of storage nodes coupled to a plurality of backup storage devices. Each storage node may host one or more storage volumes. Backup software may execute to control backup tasks for the clustered storage system, e.g., to instruct each storage node to backup the volume(s) it hosts onto one or more of the backup storage devices.

According to some embodiments, the method may operate to automatically determine configuration information specifying a configuration of the clustered storage system. Determining the configuration information may include detecting each storage node of the plurality of storage nodes in the clustered storage system. For each respective storage node, the one or more storage volumes hosted by the respective storage node may also be detected, as well as the one or more backup storage devices to which the respective storage node is connected.

The method may operate to backup the plurality of storage volumes by performing a plurality of backup tasks. Performing each respective backup task may comprise selecting a particular storage volume, a particular storage node, and a particular backup storage device depending upon the configuration information and information indicating currently active backup tasks in the clustered storage system. The respective backup task may be initiated by communicating with the particular storage node to instruct the particular storage node to backup the particular storage volume to the particular backup storage device. The method may also update the information indicating the currently active backup tasks to reflect the initiation of the respective backup task.

BRIEF DESCRIPTION OF THE DRAWINGS

A better understanding of the invention can be obtained when the following detailed description is considered in conjunction with the following drawings, in which.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for backing up data from a clustered storage system are described herein. The clustered storage system may include a plurality of storage nodes coupled to a plurality of backup storage devices. Each storage node may host one or more storage volumes. Backup software may execute to initiate backup tasks for the clustered storage system, e.g., to instruct each storage node to backup the volume(s) it hosts onto one or more of the backup storage devices.

In various embodiments the backup software may employ any of various methods to initiate the backup tasks in the clustered storage system. According to some embodiments, the backup software may attempt to load balance backup tasks across the storage nodes in the clustered storage system. The backup software may take into account both the topology of the clustered storage system and the current backup tasks active in the clustered storage system. For example, when initiating a new backup task, the backup software may take into account factors such as the number of backup tasks currently executing on each storage node, the number of storage nodes that share each backup storage device, the number of storage volumes that remain to be backed up on each storage node, the total number of storage volumes that remain to be backed up on all the storage nodes, the availability of backup storage devices connected to each storage node, etc.

Figure 1:
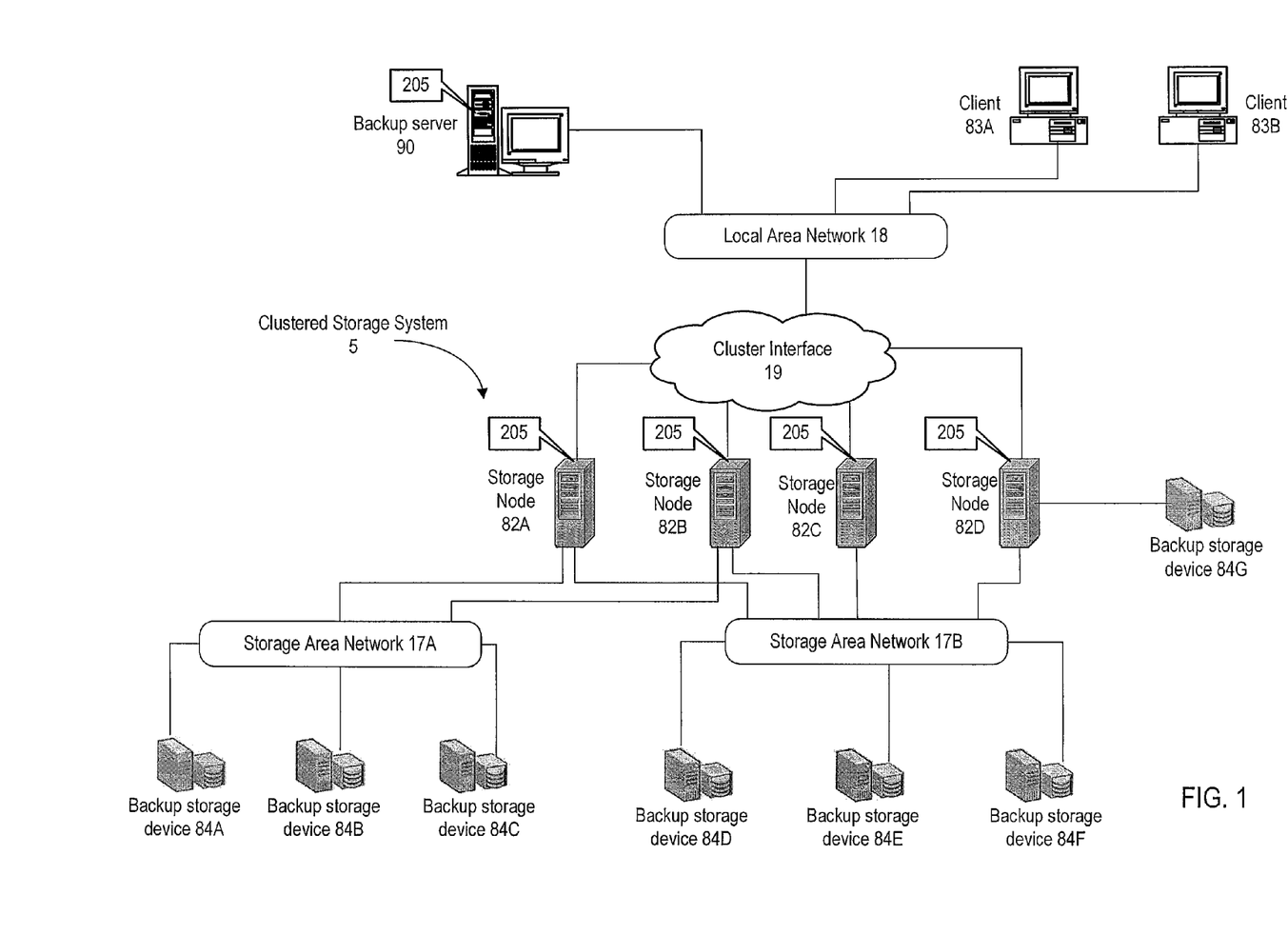
FIG. 1 illustrates an example of a clustered storage system including a plurality of storage nodes coupled to a plurality of backup storage devices.

Referring now to FIG. 1, an example of the system according to one embodiment is illustrated. The system includes a plurality of storage nodes 82, which are collectively referred to herein as a clustered storage system. The system of FIG. 1 also illustrates a plurality of backup storage devices 84. In this example the system includes four storage nodes 82A-82D and seven backup storage devices 84A-84G. However, in other embodiments the system may include different numbers of storage nodes 82 and backup storage devices 84.

Each storage node 82 in the storage cluster may host one or more volumes. As used herein, the term volume refers to a set of files in which data is stored. A volume is also referred to herein as a storage volume. A storage node 82 "hosting" a volume means that the storage node 82 enables software applications to access the volume, e.g., in order to read data from and/or write data to the files in the volume. The software applications that access the volume may execute on other devices in the system and may communicate with the storage node 82 through a local area network 18 to access the volume. For example, as illustrated in FIG. 1, the system may include one or more client computers 83 which execute software applications that access volumes hosted by the storage nodes 82. For example, in some embodiments the client computers 83A and 83B may be application server computers which execute database applications, electronic commerce applications, or other types of software applications which use files stored in volumes hosted by various storage nodes 82.

The system also includes a backup server computer 90 on which server-side backup software 205 executes to control or initiate backup tasks for the clustered storage system. For example, the server-side backup software 205 may communicate with client-side backup software 205 executing on each of the storage nodes 82 to instruct the storage nodes 82 to backup their storage volumes onto particular backup storage devices 84. Unless otherwise indicated, the server-side backup software 205 and the client-side backup software 205 is referred to collectively herein as "backup software 205". In some embodiments the server-side backup software 205 may be distributed across multiple backup server computers. Also, in some embodiments the backup server computer 90 may operate primarily to perform or manage backup operations for the clustered storage system, while in other embodiments the backup server computer 90 may be a general purpose server computer that also performs various other functions to manage the clustered storage system.

In various embodiments each storage node 82 may be any type of device configured to host storage volumes for access by software applications which execute on other devices in the system. In some embodiments, the storage nodes 82 may be devices specialized for or dedicated to providing file sharing or volume hosting services for other devices in the system, e.g., for the client computers 82. Examples of storage nodes 82 include network attached storage (NAS) devices, network appliances, intelligent storage devices, etc. In various embodiments the storage nodes 82 may include various types of storage on which the volume files are stored, such as one or more disk drives. In some embodiments each storage node 82 may include a plurality of high performance and high capacity disk drives which enable the storage node 82 to store a large amount of data and serve the data quickly over the local area network 18 to the client computers 82.

As illustrated in FIG. 1, in some embodiments the server-side backup software 205 executing on the backup server computer 90 and the software applications executing on the client computers 83 may communicate with the storage nodes 82 through a virtual interface referred to as the cluster interface 19.

In various embodiments the storage nodes 82 may be coupled to the backup storage devices 84 in any of various ways. For example, in some embodiments the storage nodes 82 may communicate with the backup storage devices 84 through one or more storage area networks (SANs) 17. In the example illustrated in FIG. 1, the system includes two SANs 17A and 17B. The storage nodes 82A and 82B are configured to access both the SAN 17A and the SAN 17B, whereas the storage nodes 82C and 82D are only configured to access the SAN 17B. In this example, the storage node 82D is also configured to access the backup storage device 84G without communicating through a SAN. For example, the backup storage device 84G may be coupled directly to the storage node 82D through a communication bus, for example.

It is noted that FIG. 1 is provided as an example, and in various other embodiments the storage nodes 82 and backup storage devices 84 may be interconnected according to any desired architecture and may use any of various technologies to communicate, such as direct attached storage, iSCSI storage, or through fibre channel networks or any of various other types of networks.

In various embodiments each backup storage device 84 may be any type of device operable to store data. Examples of backup storage devices 84 include tape drives (e.g., devices operable to store data on tape cartridges), disk storage units (e.g., devices including one or more disk drives), optical storage devices (e.g., devices operable to store data on optical media), flash memory storage devices, etc.

Also, in various embodiments the backup server computer 90 and the client computers 83 may be coupled to and may communicate with the storage nodes 82 in any of various ways. For example, the backup server computer 90 and/or the client computers 83 may be coupled to the storage nodes 82 through any type of network or combination of networks. For example, the network may include any type or combination of local area network (LAN) (e.g., the LAN 18 in FIG. 1), a wide area network (WAN), wireless networks, an Intranet, the Internet, etc. Examples of local area networks include Ethernet networks, Fiber Distributed Data Interface (FDDI) networks, and token ring networks. Also, each device may each be coupled to the network using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Referring again to FIG. 1, the storage nodes 82A and 82B can potentially access any of the backup storage devices 84A-F through the SANs 17A and 17B, and the storage nodes 82C and 82D can potentially access any of the backup storage devices 84D-F through the SAN 17B. However, in order to actually communicate with a particular backup storage device, a particular storage node may first need to establish a connection (e.g., a virtual connection or communication link) to the particular backup storage device. According to the terminology used herein, a particular storage node 82 is said to have a connection to a particular backup storage device 84 at a given time if the particular storage node 82 is currently able to send data to the particular backup storage device 84, e.g., in order to backup the data from a volume hosted on the particular storage node 82.

Figure 2:
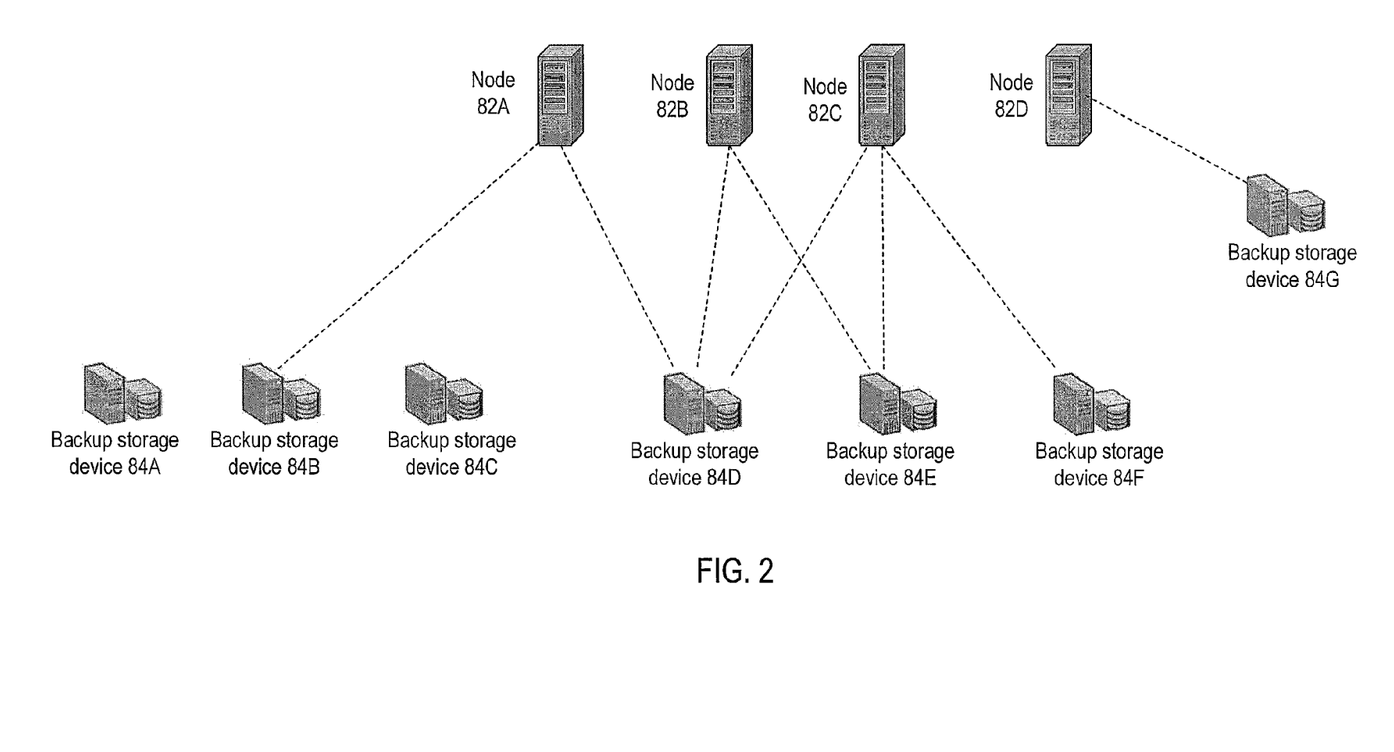
FIG. 2 illustrates an example of connections between the storage nodes and the backup storage devices.

For example, FIG. 2 illustrates a particular point in time in which the storage node 82A has established connections to the backup storage devices 84B and 84D; the node 82B has established connections to the backup storage devices 84D and 84E; the node 82C has established connections to the backup storage devices 84D, 84E, and 84F; and the node 82D has established a connection to the backup storage device 84G. Thus, at the point in time illustrated in FIG. 2, the node 82A is currently able to backup its volume data to either one of the backup storage devices 84B and 84D, and the other nodes 82 are similarly able to backup their volume data to the respective backup storage devices 84 to which they currently have connections.

In some embodiments the backup software 205 may perform or control a backup task by instructing a particular storage node 82 to backup one or more of its volumes to a particular backup storage device 84. Thus, the backup software 205 may need to know which backup storage devices 84 are currently connected to the particular storage node 82 (e.g., which backup storage devices 84 the particular storage node 82 has established connections with). For example, in FIG. 2 the backup software 205 may select one of the backup storage devices 84B or 84D to which the storage node 82A is currently connected and may instruct the storage node 82A to backup one or more of the volumes currently hosted on the node 82A to the selected backup storage device.

The system may operate to perform a discovery process to discover configuration information for the clustered storage system. The configuration information may specify the topology of the storage cluster, such as which storage nodes are present, which backup storage devices are present, and which storage nodes are connected to which backup storage devices. The configuration information may also indicate which storage volumes are present, and which volumes are hosted on which storage nodes.

Figure 3:
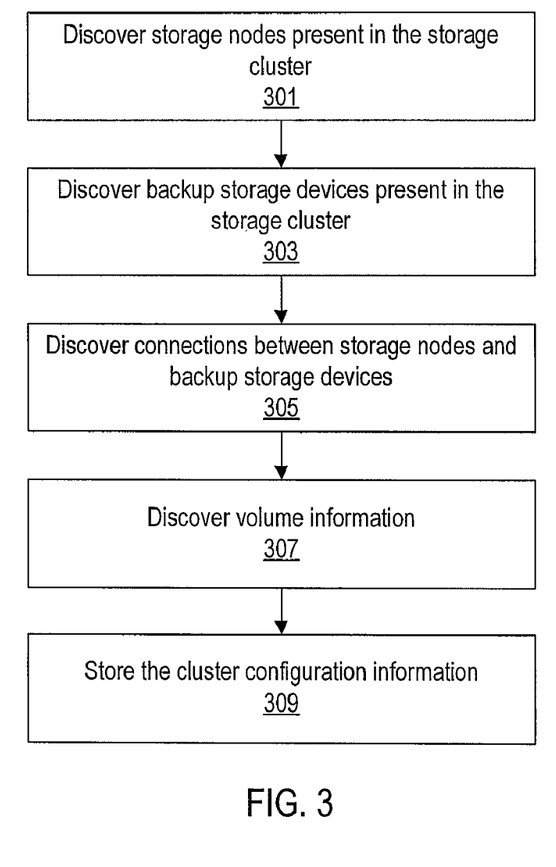
FIG. 3 is a flowchart diagram illustrating one embodiment of a discovery process to automatically determine information about the topology of the clustered storage system and other aspects of the clustered storage system's configuration.

The configuration information used by the backup software 205 may be discovered through a discovery process, e.g., a process performed or initiated by the backup software 205 in order to determine information about the topology of the clustered storage system and other aspects of the clustered storage system's configuration. FIG. 3 is a flowchart diagram illustrating one embodiment of the discovery process.

In block 301, the storage nodes present in the storage cluster may be automatically discovered. In various embodiments, any node discovery techniques known in the art may be used to discover which storage nodes are currently present and functioning in the storage cluster. As one example, the server-side backup software 205 on the backup server computer 90 may send a node discovery message over one or more networks to the clustered storage system, where the node discovery message is delivered to each storage node 82 on the network and requests the storage nodes to reply by identifying themselves. As another example, the server-side backup software 205 may communicate with one or more other server computers to request information specifying which storage nodes are currently in the clustered storage system.

In block 303, the backup storage devices 84 present in the system may be automatically discovered. In various embodiments, any of various techniques may be used to discover which backup storage devices are currently present and functioning in the system. For example, the server-side backup software 205 may send a discovery message to which the backup storage devices reply, or may communicate with one or more other server computers or with the storage nodes to request information specifying which backup storage devices are currently in the system.

In block 305, the server-side backup software 205 may operate to automatically determine which storage nodes are currently connected to which backup storage devices. For example, in some embodiments the server-side backup software 205 may communicate with each respective storage node in the clustered storage system and request it to reply with a list of backup storage devices with which the respective storage node can currently use for backup. In another embodiment the server-side backup software 205 may communicate with each respective backup storage device in the system and request it to reply with a list of storage nodes with which the respective backup storage device can communicate. In another embodiment the server-side backup software 205 may retrieve information from another server or database that specifies which storage nodes are currently connected to which backup storage devices.

In block 307, the server-side backup software 205 may operate to automatically determine information regarding storage volumes implemented in the clustered storage system. In particular, the server-side backup software 205 may determine a list of volumes that need to be backed up and may determine which storage node 82 hosts each volume. In some embodiments the clustered storage system may provide a mapping technique, e.g., through a proprietary application programming interface (API) or through an extension of a standardized interface such as Network Data Management Protocol (NDMP), to map a file system path into volumes and relate these volumes to storage nodes. For example, the mapping technique may enable the server-side backup software 205 to discover information regarding each volume, such as: the mount point or relative path at which the volume is mounted in the networked file system; a globally unique volume ID for the volume; and the storage node currently managing the volume.

Thus, during the discovery process the server-side backup software 205 may discover configuration information needed for correctly backing up the volumes from the storage nodes 82 to the backup storage devices 84. The configuration information may include information specifying the topology of the system, such as which storage nodes are present, which backup storage devices are present, and which storage nodes are connected to which backup storage devices. The configuration information may also include information regarding the data to be backed up, such as a list of file system volumes implemented in the storage cluster, and which volumes are hosted on which storage nodes.

In block 309 the server-side backup software 205 may store the configuration information discovered in the discovery process, e.g., on non-volatile storage (e.g., a disk drive) or in dynamic memory of the backup server 90. In various embodiments the configuration information may be structured or stored in any of various ways, e.g., in one or more data structures, files, or databases.

Figure 4:
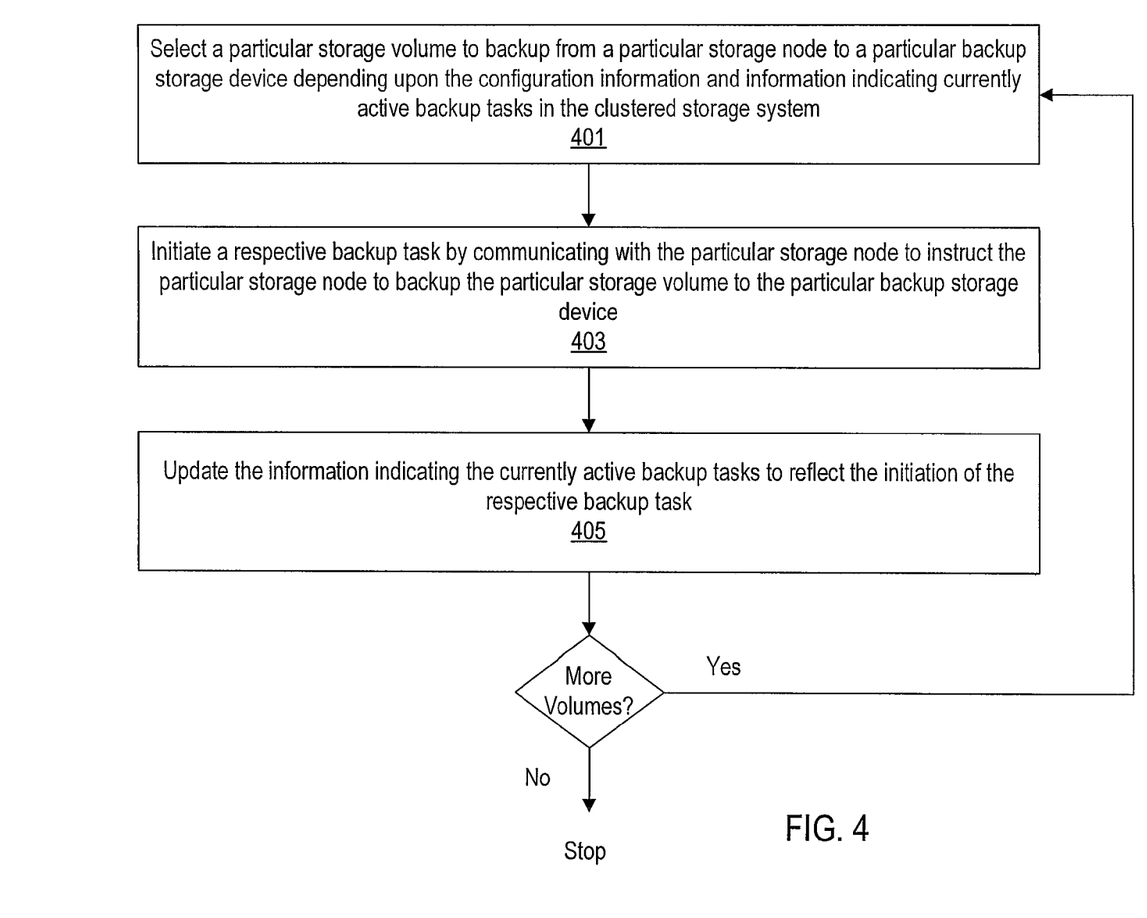
FIG. 4 is a flowchart diagram illustrating one embodiment of a method for backing up storage volumes from the storage nodes in the clustered storage system to the backup storage devices.

Once the configuration information has been discovered and stored, the backup software 205 may use the configuration information to initiate a plurality of backup tasks to backup the storage volumes from the storage nodes 82 to the backup storage devices 84. FIG. 4 is a flowchart diagram illustrating one embodiment of a method for backing up the storage volumes.

As indicated in block 401, the backup software 205 may select a particular storage volume to backup from a particular storage node to a particular backup storage device. The particular storage volume, the particular storage node, and the particular backup storage device may be selected depending upon the previously determined configuration information, and also depending upon activity information indicating which backup tasks are currently active in the clustered storage system. (If no backup tasks have been started yet then the activity information will indicate that there are no currently active backup tasks.)

In block 403 the backup software 205 may initiate a respective backup task by communicating with the particular storage node selected in block 401 to instruct the particular storage node to backup the particular storage volume to the particular backup storage device.

In block 405 the backup software 205 may update the activity information indicating the currently active backup tasks to reflect the initiation of the respective backup task, i.e., to indicate that the backup task was initiated in block 403.

If there are more volumes to be backed up then the process continues, as indicated by the flowchart arrow returning to block 401.

Thus, each time a new backup task is initiated, the activity information is updated to reflect the current backup activity occurring in the clustered storage system. The activity information may indicate information such as how many backup tasks are currently active on each storage node, which backup storage devices are currently in use by each node, which backup storage devices are currently available for use by which nodes, etc. The backup software 205 may use this activity information, together with the configuration information indicating the topology of the clustered storage system to determine how to distribute backup tasks across the nodes and how to assign the backup tasks to the available backup storage devices. When a given backup task completes, the backup software 205 may update the activity information to indicate that the resources used by that backup task are now available for other backup tasks to use.

Various embodiments of the method of FIG. 4 may enable the backup software 205 to efficiently backup the storage nodes 82 in the clustered storage system to the backup storage devices 84 by taking the current backup activity of the clustered storage system into account when initiating new backup tasks. In some embodiments the backup software 205 may attempt to optimize the backup of the clustered storage system by load balancing the backup tasks across the storage nodes. For example, by using the activity information to take into account the number of backup tasks currently executing on each storage node, the backup software may avoid initiating a disproportionate number of backup tasks on any given node, which could overload its available processor power, network bandwidth, or other resources.

Figure 5:
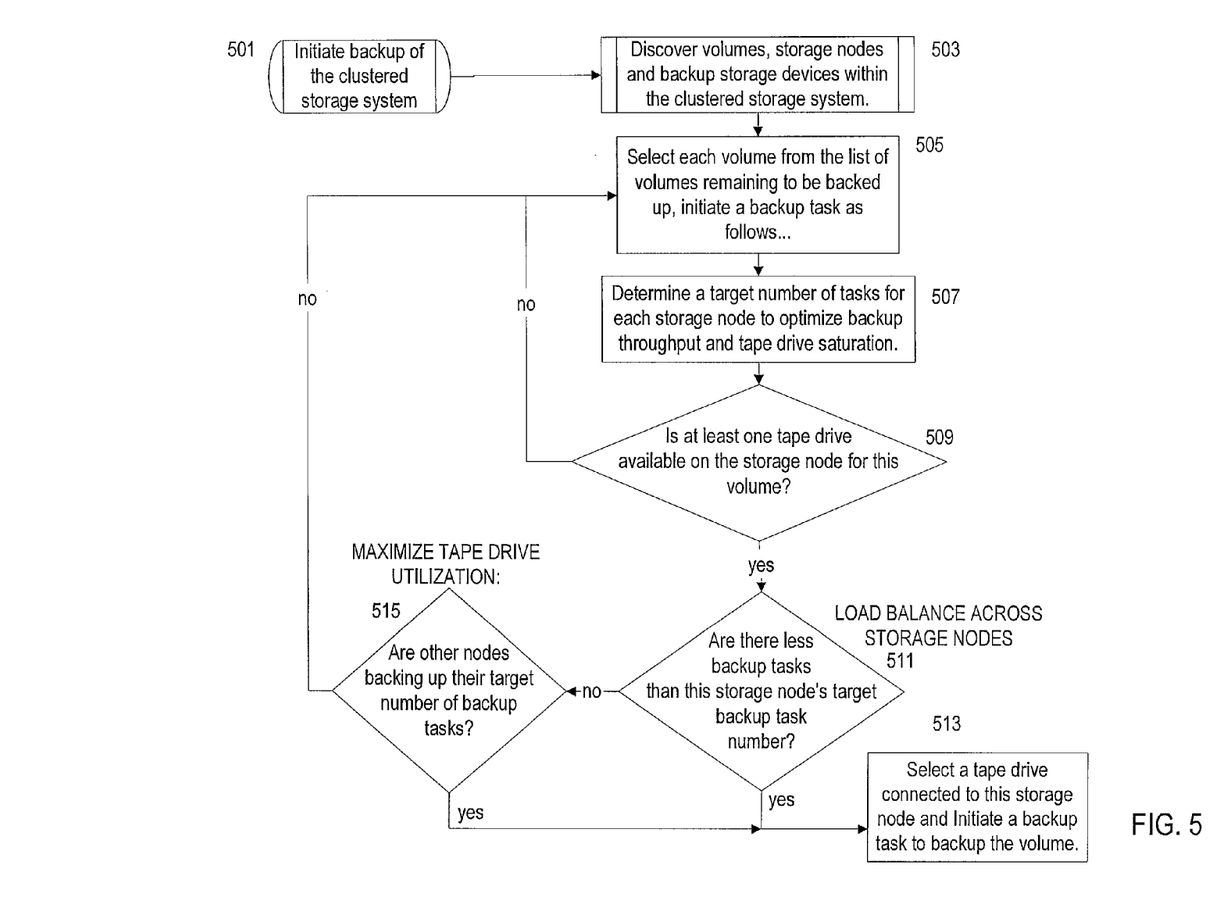
FIG. 5 is a flowchart diagram illustrating a more detailed embodiment of backing up storage volumes from the storage nodes in the clustered storage system to the backup storage devices.

In some embodiments the backup software 205 may initiate backup tasks by calculating a target number of backup tasks for each storage node of the clustered system and distributing backup tasks across the storage nodes such that each storage node executes its target number of backup tasks. For example, FIG. 5 is a flowchart diagram illustrating one embodiment of a method which initiates backup tasks on storage nodes based on target numbers of backup tasks for the storage nodes. The method illustrated in FIG. 5 may be implemented by the server-side backup software 205 on the backup server 90 executing in conjunction with the client-side backup software 205 executing on the storage nodes 82.

As illustrated in block 501, a backup of the clustered storage system may be initiated in order to backup the volumes hosted by the storage nodes 82 to the backup storage devices 84. For example, in some embodiments an administrator of the clustered storage system may interact with an administrative graphical user interface of the backup software 205 to request the backup to be initiated. In other embodiments the backup software 205 may be configured to automatically initiate backups of the clustered storage system, e.g., at scheduled times, such as daily, weekly, etc.

In block 503, a discovery process may be performed to automatically determine configuration information about the clustered storage system, such as the components present in the clustered storage system and their relationship to each other, as described above with reference to the flowchart of FIG. 3. The discovery process may operate to automatically discover the volumes, storage nodes, and backup storage devices present in the clustered storage system. The relationship of volumes to storage nodes, as well as the connections among backup storage devices and storage nodes is also learned in the discovery process.

Thus, the discovery process may automatically determine a list of volumes to be backed up from the storage nodes. As indicated in block 505, the volumes may be backed up by selecting each volume from the list and initiating a backup task to backup the volume as follows.

In block 507, the backup software 205 may calculate a target number of backup tasks for each storage node. In various embodiments the backup software 205 may be configured to calculate the target number of backup tasks for each storage node using any of various parameters or algorithms. In some embodiments the target numbers of backup tasks may be calculated using an equation or algorithm that will load balance the backup tasks across the storage nodes, while also ensuring that all of the available backup storage devices are used. This may help to optimize backup throughput and ensure that the backup of the clustered storage system is performed efficiently without overloading the resources of any particular storage node.

Figure 6:
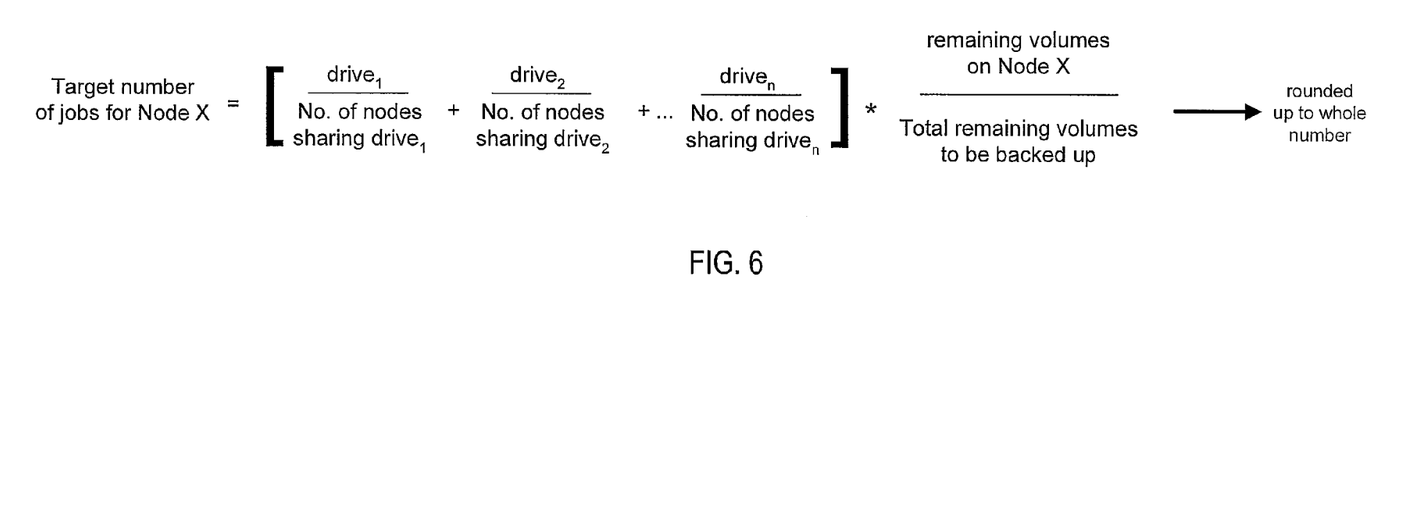
FIG. 6 illustrates one example of an equation for calculating a target number of backup tasks for a storage node when backing up the clustered storage system.

FIG. 6 illustrates one example of an equation for calculating the target number of backup tasks for the storage nodes. Consider a storage node X that has N backup storage devices connected to it, which in this example are tape drives. In other words, the node X is connected to $Drive_1, Drive_2, \ldots, Drive_N$. As illustrated above in FIG. 1, other storage nodes may also be connected to one or more of these tape drives. For each tape drive (or other backup storage device) connected to the node X, a ratio is computed as 1 divided by the number of storage nodes that share the tape drive. These ratios are added together, and the sum is multiplied by the number of remaining volumes on the node X that have not yet been backed up, divided by the total number of remaining volumes on all the nodes that have not yet been backed up. The resulting number is then rounded up to the nearest whole number to give the target number of backup tasks for the node X.

Referring again to FIG. 5, in block 509 the backup software 205 operates to determine whether there is at least one tape drive (or other backup storage device) currently available for use by the storage node that hosts the volume selected from the list in block 505. If not, then the volume is placed back in the list, and the operation returns to block 505 to select another volume from the list.

Otherwise, the operation proceeds to block 511 where the backup software 205 determines whether the storage node that hosts the selected volume is currently executing fewer backup tasks than the calculated target number of backup tasks for this storage node. If so then the backup software 205 selects an available tape drive (or other backup storage device) connected to the storage node and instructs the storage node to initiate a new backup task to backup the volume. The storage node may then communicate with the tape drive to backup the volume to the tape drive. The backup software 205 updates its activity information for the clustered storage system to reflect that the backup task has been initiated and that the tape drive is currently in use by the storage node. The backup software 205 may also monitor the status of the backup task, or may be notified by the storage node when the backup task completes so that the activity information can later be updated to indicate that the tape drive is once again available for use.

Referring again to block 511, if the storage node that hosts the selected volume is already executing at least its target number of backup tasks then the flowchart operation proceeds to block 515. In block 515 the backup software 205 determines whether all of the other storage nodes in the clustered storage system are currently backing up their respective target numbers of backup tasks. If not then the volume is placed back in the list, and the operation returns to block 505 to select another volume from the list. In this manner, the backup software 205 may operate to distribute or load balance backup tasks across the storage nodes until each storage node is executing its respective target number of backup tasks.

In some embodiments, if the storage node that hosts the selected volume is already executing its target number of backup tasks, and all of the other storage nodes are also executing their target numbers of backup tasks, then a new backup task may still be initiated to backup the selected volume, as indicated by the flowchart arrow from block 515 to block 513. Thus, in some embodiments the target number of backup tasks may be exceeded for one or more of the storage nodes in the clustered storage system. This may ensure that all of the available tape drives or other backup storage devices are used so that as many backup tasks as possible are executed concurrently. In other embodiments the backup software 205 may ensure that the target number of backup tasks is not exceeded on any of the storage nodes.

Thus, the method of FIG. 5 operates to dynamically adjust the target numbers of backup tasks for the storage nodes as new backup tasks are initiated. The target numbers of backup tasks may be re-adjusted as new backup tasks begin and other backup tasks complete so that the backup tasks are dynamically load balanced across the storage nodes.

It is noted that FIG. 5 illustrates one example of a method for backing up a clustered storage system, and numerous alternative embodiments are contemplated. In general, any of various methods may be used in order to load balance the backup tasks across the storage nodes. When initiating each backup task, the backup software 205 may take into account both the topology of the clustered storage system and the current backup tasks active in the clustered storage system. For example, when initiating a new backup task, the backup software 205 may take into account factors such as the number of backup tasks currently executing on each storage node, the number of storage nodes that share each backup storage device, the number of storage volumes that remain to be backed up on each storage node, the total number of storage volumes that remain to be backed up on all the storage nodes, the availability of backup storage devices connected to each storage node, etc.

Figure 7:
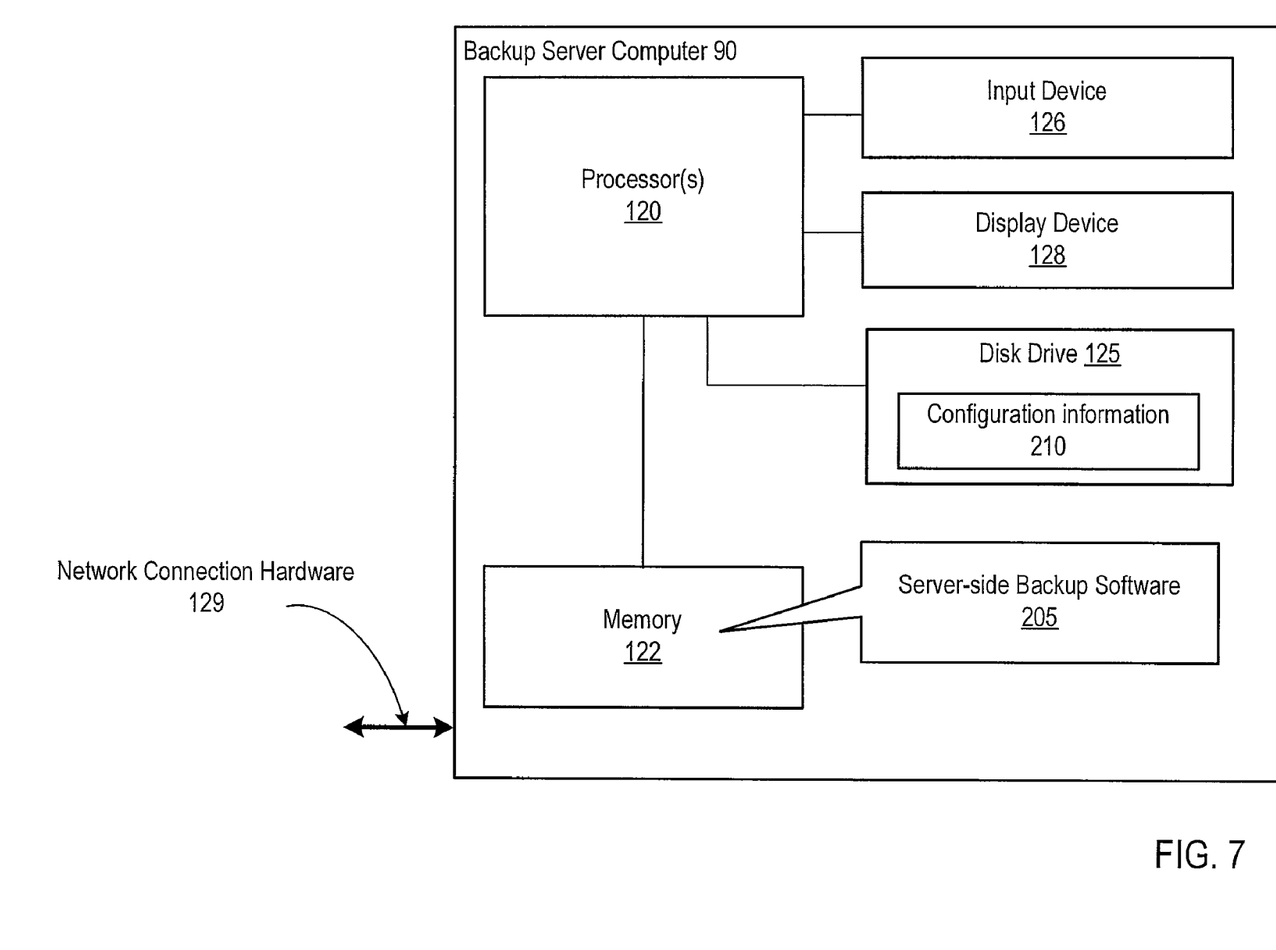
FIG. 7 illustrates an example embodiment of a backup server computer which executes server-side backup software.

Referring now to FIG. 7, an example embodiment of the backup server computer 90 is illustrated. It is noted that FIG. 7 is provided as an example, and in other embodiments the backup server computer 90 may be implemented in various other ways.

In this example, the backup server 90 includes one or more processors 120 coupled to memory 122. In some embodiments, the memory 122 may include one or more forms of random access memory (RAM) such as dynamic RAM (DRAM) or synchronous DRAM (SDRAM). However, in other embodiments, the memory 122 may include any other type of memory instead or in addition.

The memory 122 may be configured to store program instructions and/or data. In particular, the memory 122 may store a portion of the backup software 205, e.g., server-side backup software 205. The processor(s) 120 may execute the server-side backup software 205. The server-side backup software 205 may communicate with client-side backup software 205 executing on the storage nodes 82 to perform the functions described herein to backup storage volumes from the storage nodes 82 to the backup storage devices 84. The memory 122 may also store other software which operates in conjunction with or which is used by the server-side backup software 205, such as operating system software, file system software, network communication software, etc.

In various embodiments the server-side backup software 205 may be implemented in any of various ways and may have any desired software architecture. In some embodiments the server-side backup software 205 may be distributed across multiple backup server computers.

Referring again to FIG. 7, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the backup server 90 may include multiple processors 120.

The backup server 90 may include one or more hard disk drives 125 or other storage devices for storing data in a non-volatile manner. In some embodiments the configuration information discovered in the discovery process of FIG. 3 may be stored on one or more of the hard disk drives 125, e.g., as illustrated by the configuration information 210. In other embodiments the configuration information may be stored in the memory 122. Also, activity information indicating backup tasks currently active on each of the storage nodes 82 when backing up the clustered storage system may be stored on the hard disk drive(s) 125 and/or in the memory 122.

The backup server 90 may also include one or more input devices 126 for receiving user input, e.g., from an administrator of the clustered storage system. The input device(s) 126 may include any of various types of input devices, such as keyboards, keypads, microphones, or pointing devices (e.g., a mouse or trackball). The backup server 90 may also include one or more output devices 128 for displaying output to the administrator. The output device(s) 128 may include any of various types of output devices or display devices, such as LCD screens or monitors, CRT monitors, etc. The backup server 90 may also include network connection hardware 129 through which the backup server 90 connects to a network, e.g., in order to communicate with other devices in the system.

Figure 8:
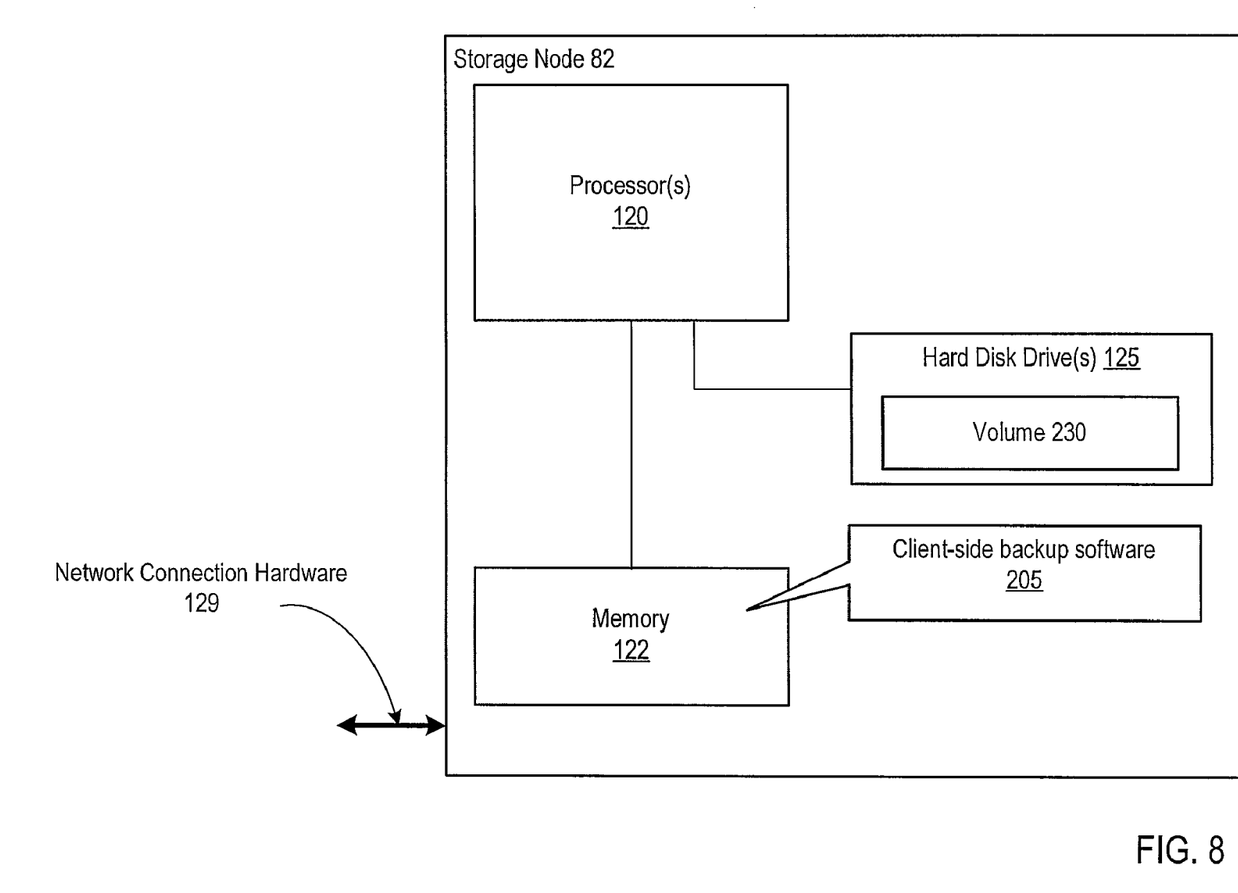
FIG. 8 illustrates an example embodiment of a storage node in the clustered storage system.

FIG. 8 illustrates an example embodiment of a storage node 82. FIG. 8 represents one example of a storage node 82, and in other embodiments the storage node 82 may be implemented in various other ways. The storage node 82 may include various elements similar to the elements of the backup server 90, e.g., one or more processors 120 coupled to memory 122.

The memory 122 may store software executed by the processor(s) 120, such as client-side backup software 205 which communicates with the server-side backup software 205 on the backup server 90 and communicates with the backup storage devices 84 to backup one or more volumes 230. The one or more volumes 230 may be stored on one or more hard disk drives 125 or other storage devices included in or coupled to the storage node 82.

It is noted that various embodiments may further include receiving, sending or storing instructions and/or data implemented in accordance with the foregoing description upon a computer-accessible storage medium. Generally speaking, a computer-accessible storage medium may include any storage media accessible by one or more computers (or processors) during use to provide instructions and/or data to the computer(s). For example, a computer-accessible storage medium may include storage media such as magnetic or optical media, e.g., one or more disks (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer(s) may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-accessible storage medium storing program instructions executable to:
   automatically determine configuration information specifying a configuration of a clustered storage system, including:
      automatically detecting each storage node of a plurality of storage nodes in the clustered storage system, wherein each storage node hosts one or more storage volumes of a plurality of storage volumes, wherein each storage node is connected to one or more backup storage devices of a plurality of backup storage devices, wherein the backup storage devices are different than the storage nodes;
      for each respective storage node of the plurality of storage nodes, automatically detecting the one or more storage volumes hosted by the respective storage node;
      for each respective storage node of the plurality of storage nodes, automatically detecting the one or more backup storage devices to which the respective storage node is connected;
   wherein the program instructions are further executable to store the configuration information in response to said automatically determining the configuration information; and
   wherein the program instructions are further executable to backup the plurality of storage volumes by performing a plurality of backup tasks, wherein performing each respective backup task comprises:
      selecting a particular storage volume, a particular storage node, and a particular backup storage device depending upon the configuration information and information indicating currently active backup tasks in the clustered storage system;
      in response to said selecting, initiating the respective backup task by communicating with the selected storage node to instruct the selected storage node to backup the selected storage volume to the selected backup storage device, wherein the selected storage volume includes a plurality of files, wherein the respective backup task operates to backup each file in the selected storage volume to the selected backup storage device; and
      updating the information indicating the currently active backup tasks to reflect the initiation of the respective backup task.

2. The computer-accessible storage medium of claim 1, wherein the particular storage node is selected depending upon a number of backup tasks currently active on the particular storage node.

3. The computer-accessible storage medium of claim 1, wherein the particular storage node is selected depending upon a number of backup tasks currently active on the particular storage node relative to a number of backup tasks currently active on one or more other storage nodes of the plurality of storage nodes.

4. The computer-accessible storage medium of claim 1, wherein selecting the particular storage node comprises:
   calculating a target number of backup tasks for the particular storage node; and
   initiating a new backup task on the particular storage node in response to determining that fewer than the target number of backup tasks are currently active on the particular storage node.

5. The computer-accessible storage medium of claim 1, wherein performing the plurality of backup tasks comprises load balancing the plurality of backup tasks across the plurality of storage nodes depending upon the configuration information and the information indicating currently active backup tasks in the clustered storage system.

6. The computer-accessible storage medium of claim 1, wherein the particular backup storage device is selected in response to determining that the configuration information indicates that the particular backup storage device is connected to the particular storage node.

7. The computer-accessible storage medium of claim 1, wherein the particular backup storage device is selected in response to determining that the information indicating the currently active backup tasks indicates that the particular backup storage device is currently not being used to back up another storage volume.

8. The computer-accessible storage medium of claim 1, wherein the program instructions are further executable to:
   in response to completion of each respective backup task of the plurality of backup tasks, update the information indicating the currently active backup tasks to reflect the completion of the respective backup task.

9. A system comprising:
   one or more processors; and
   memory storing program instructions;
   wherein the program instructions are executable by the one or more processors to automatically determine configuration information specifying a configuration of a clustered storage system, including:
      automatically detecting each storage node of a plurality of storage nodes in the clustered storage system, wherein each storage node hosts one or more storage volumes of a plurality of storage volumes, wherein each storage node is connected to one or more backup storage devices of a plurality of backup storage devices, wherein the backup storage devices are different than the storage nodes;

for each respective storage node of the plurality of storage nodes, automatically detecting the one or more storage volumes hosted by the respective storage node; and for each respective storage node of the plurality of storage nodes, automatically detecting the one or more backup storage devices to which the respective storage node is connected;

wherein the program instructions are further executable by the one or more processors to store the configuration information in response to said automatically determining the configuration information; and wherein the program instructions are further executable by the one or more processors to backup the plurality of storage volumes by performing a plurality of backup tasks, wherein performing each respective backup task comprises:

selecting a particular storage volume, a particular storage node, and a particular backup storage device depending upon the configuration information and information indicating currently active backup tasks in the clustered storage system;

in response to said selecting, initiating the respective backup task by communicating with the selected storage node to instruct the selected storage node to backup the selected storage volume to the selected backup storage device, wherein the selected storage volume includes a plurality of files, wherein the respective backup task operates to backup each file in the selected storage volume to the selected backup storage device; and updating the information indicating the currently active backup tasks to reflect the initiation of the respective backup task.

10. The system of claim 9, wherein the particular storage node is selected depending upon a number of backup tasks currently active on the particular storage node.

11. The system of claim 9, wherein the particular storage node is selected depending upon a number of backup tasks currently active on the particular storage node relative to a number of backup tasks currently active on one or more other storage nodes of the plurality of storage nodes.

12. The system of claim 9, wherein selecting the particular storage node comprises:

calculating a target number of backup tasks for the particular storage node; and initiating a new backup task on the particular storage node in response to determining that fewer than the target number of backup tasks are currently active on the particular storage node.

13. The system of claim 9, wherein performing the plurality of backup tasks comprises load balancing the plurality of backup tasks across the plurality of storage nodes depending upon the configuration information and the information indicating currently active backup tasks in the clustered storage system.

14. The system of claim 9, wherein the particular backup storage device is selected in response to determining that the configuration information indicates that the particular backup storage device is connected to the particular storage node.

15. The system of claim 9, wherein the particular backup storage device is selected in response to determining that the information indicating the currently active backup tasks indicates that the particular backup storage device is currently not being used to back up another storage volume.

16. The system of claim 9, wherein the program instructions are further executable to:

in response to completion of each respective backup task of the plurality of backup tasks, update the information indicating the currently active backup tasks to reflect the completion of the respective backup task.

17. A method comprising:

automatically determining configuration information specifying a configuration of a clustered storage system, including:

automatically detecting each storage node of a plurality of storage nodes in the clustered storage system, wherein each storage node hosts one or more storage volumes of a plurality of storage volumes, wherein each storage node is connected to one or more backup storage devices of a plurality of backup storage devices, wherein the backup storage devices are different than the storage nodes;

for each respective storage node of the plurality of storage nodes, automatically detecting the one or more storage volumes hosted by the respective storage node;

for each respective storage node of the plurality of storage nodes, automatically detecting the one or more backup storage devices to which the respective storage node is connected;

storing the configuration information in response to said automatically determining the configuration information; and backing up the plurality of storage volumes by performing a plurality of backup tasks, wherein performing each respective backup task comprises:

selecting a particular storage volume, a particular storage node, and a particular backup storage device depending upon the configuration information and information indicating currently active backup tasks in the clustered storage system;

in response to said selecting, initiating the respective backup task by communicating with the selected storage node to instruct the selected storage node to backup the selected storage volume to the selected backup storage device, wherein the selected storage volume includes a plurality of files, wherein the respective backup task operates to backup each file in the selected storage volume to the selected backup storage device; and updating the information indicating the currently active backup tasks to reflect the initiation of the respective backup task.

18. The method of claim 17, wherein the particular storage node is selected depending upon a number of backup tasks currently active on the particular storage node relative to a number of backup tasks currently active on one or more other storage nodes of the plurality of storage nodes.

19. The method of claim 17, further comprising:

in response to completion of each respective backup task of the plurality of backup tasks, updating the information indicating the currently active backup tasks to reflect the completion of the respective backup task.

20. The computer-accessible storage medium of claim 1, wherein one or more of the storage nodes are coupled to one or more of the backup storage devices through a storage area network (SAN).

* * * * *